US008565172B2

(12) United States Patent
Hosono

(10) Patent No.: US 8,565,172 B2
(45) Date of Patent: Oct. 22, 2013

(54) RADIO CONTROL APPARATUS AND RADIO TRANSMISSION TIMING DETERMINATION METHOD

(75) Inventor: Hiroyuki Hosono, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 427 days.

(21) Appl. No.: 12/864,174

(22) PCT Filed: Jan. 23, 2009

(86) PCT No.: PCT/JP2009/051073
§ 371 (c)(1),
(2), (4) Date: Jul. 22, 2010

(87) PCT Pub. No.: WO2009/093687
PCT Pub. Date: Jul. 30, 2009

(65) Prior Publication Data
US 2010/0303043 A1    Dec. 2, 2010

(30) Foreign Application Priority Data
Jan. 24, 2008  (JP) ................................ 2008-014228

(51) Int. Cl.
*H04W 52/54* (2009.01)
(52) U.S. Cl.
CPC ..................................... *H04W 52/54* (2013.01)
USPC ....................................................... 370/329
(58) Field of Classification Search
USPC .................................................. 370/335, 350
See application file for complete search history.

(56) References Cited

U.S. PATENT DOCUMENTS

| | | | |
|---|---|---|---|
| 5,734,648 A | 3/1998 | Adachi et al. | |
| 2002/0150058 A1 | 10/2002 | Kim et al. | |
| 2003/0063597 A1 | 4/2003 | Suzuki | |
| 2009/0046667 A1* | 2/2009 | Pelletier et al. | 370/335 |
| 2009/0168750 A1* | 7/2009 | Pelletier et al. | 370/350 |

FOREIGN PATENT DOCUMENTS

| | | |
|---|---|---|
| JP | 2 260929 | 10/1990 |
| JP | 7 312783 | 11/1995 |
| JP | 2002 064418 | 2/2002 |
| JP | 2007 208525 | 8/2007 |
| WO | WO 01/59968 A1 | 8/2001 |

OTHER PUBLICATIONS

Qualcomm Eruope "F-DPCH time alignment", R1-062024, 3GPP TSG-RAN WG1 #46 Aug. 28-Sep. 1, 2006, Tallinn Estonia.*

(Continued)

*Primary Examiner* — Huy D Vu
*Assistant Examiner* — Joseph Bednash
(74) *Attorney, Agent, or Firm* — Oblon, Spivak, McClelland, Maier & Neustadt, L.L.P.

(57) ABSTRACT

In a CDMA communication system where each radio slot has a plurality of short slots, a radio control apparatus allows a plurality of mobile stations using a single channelization code for communication with a radio base station apparatus to share the same radio slot by allocating different short slots to the plurality of mobile stations in its cell. The radio control apparatus includes a short slot storage unit for storing the usage status of a short slot which has been allocated already; a short slot selection unit for selecting a single unoccupied short slot for a new radio link between a new mobile station and the radio base station apparatus, in accordance with the usage status; and a transmission timing determination unit for randomly determining the radio transmission timing of a radio frame used for communication in the new radio link, in accordance with the selected short slot, such that the timing does not overlap with the radio transmission timing used by an existing link.

8 Claims, 7 Drawing Sheets

(56) References Cited

OTHER PUBLICATIONS

Nortel Networks "Fractional DPCH overview and requirements", TSG-RAN Working Group1 Meeting #37, Montreal, Canada, May 10-14, 2004.*
3GPP- TSG-RAN WG1 Meeting #40, R1-050178, p. 53.*
ETSI TS 125.211 V7.4.0, Dec. 11, 2007, pp. 41-44.*
ETSI TS 125 331 V 8.0.0, Oct. 23, 2007, pp. 37, 669-670.*
Office Action issued Jun. 12, 2012 in Japanese Application No. 2009-550570 (With English Translation).
"3rd GPP TS 25.211; Technical Specification 3rd Group Radio Access Network; Physical Channels and Mapping of Transport Channels Onto Physical Channels (FDD)," <http://www.3gpp.org/ftp/Specs/2007-12/Rel-6/25.series/25 211-690.zip> vol. 6.9.0 pp. 1-51 (Nov. 2007).
Extended European Search Report issued Mar. 17, 2011, in Application No. / Patent No. 09703996.0-2413 / 2247149 PCT/JP2009051073.
"Universal Mobile Telecommunications System (UMTS); Physical channels and mapping of transport channels onto physical channels (FDD) (#GPP TS 25.211 version 6.9.0 Release 6)", ETSI TS 125 211, V6.9.0, 2008, pp. 1-52 (plus cover page).
Combined Chinese Office Action and Search Report issued Sep. 27, 2012 in Chinese Patent Application No. 200980102985.6 (with English-language translation).

\* cited by examiner

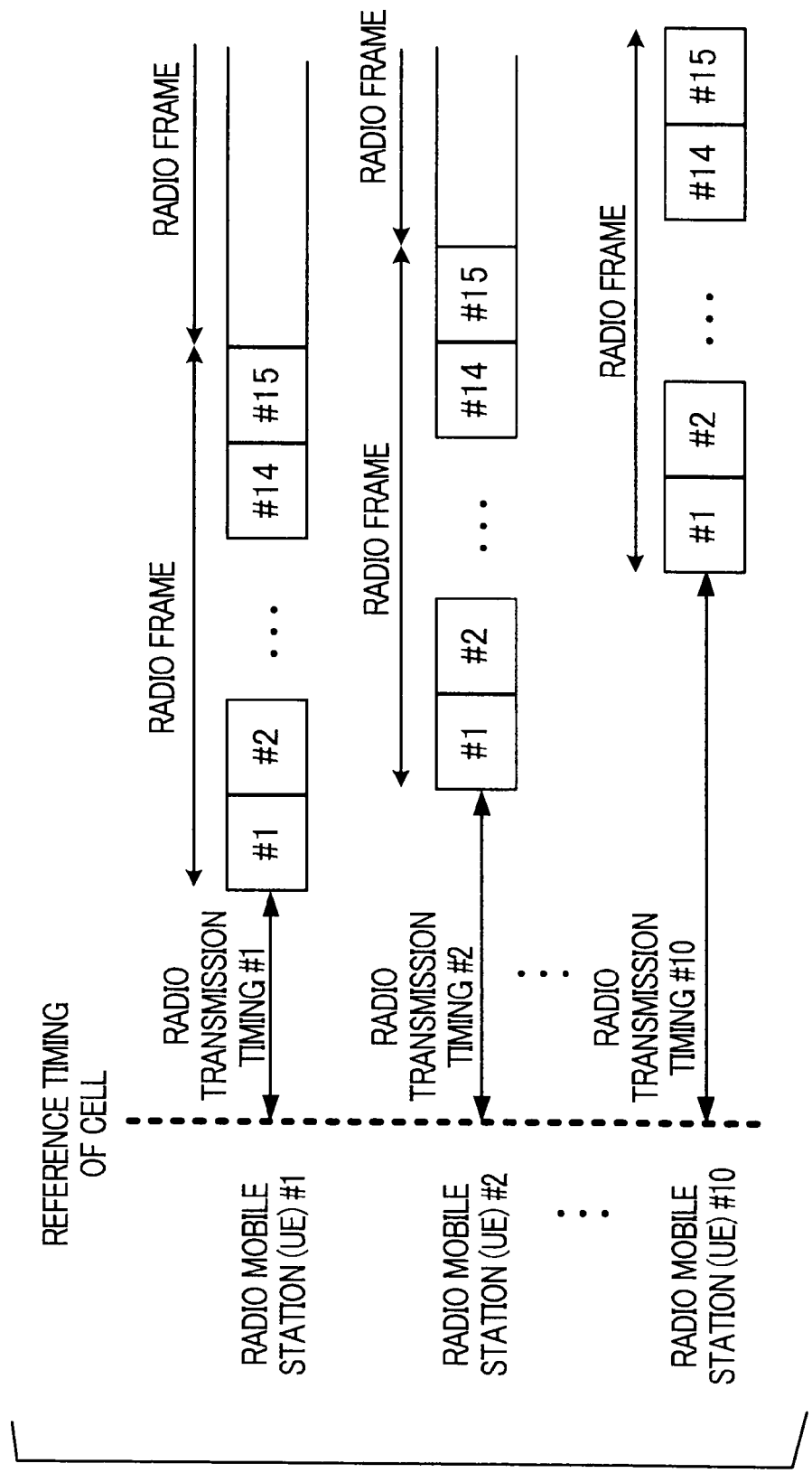

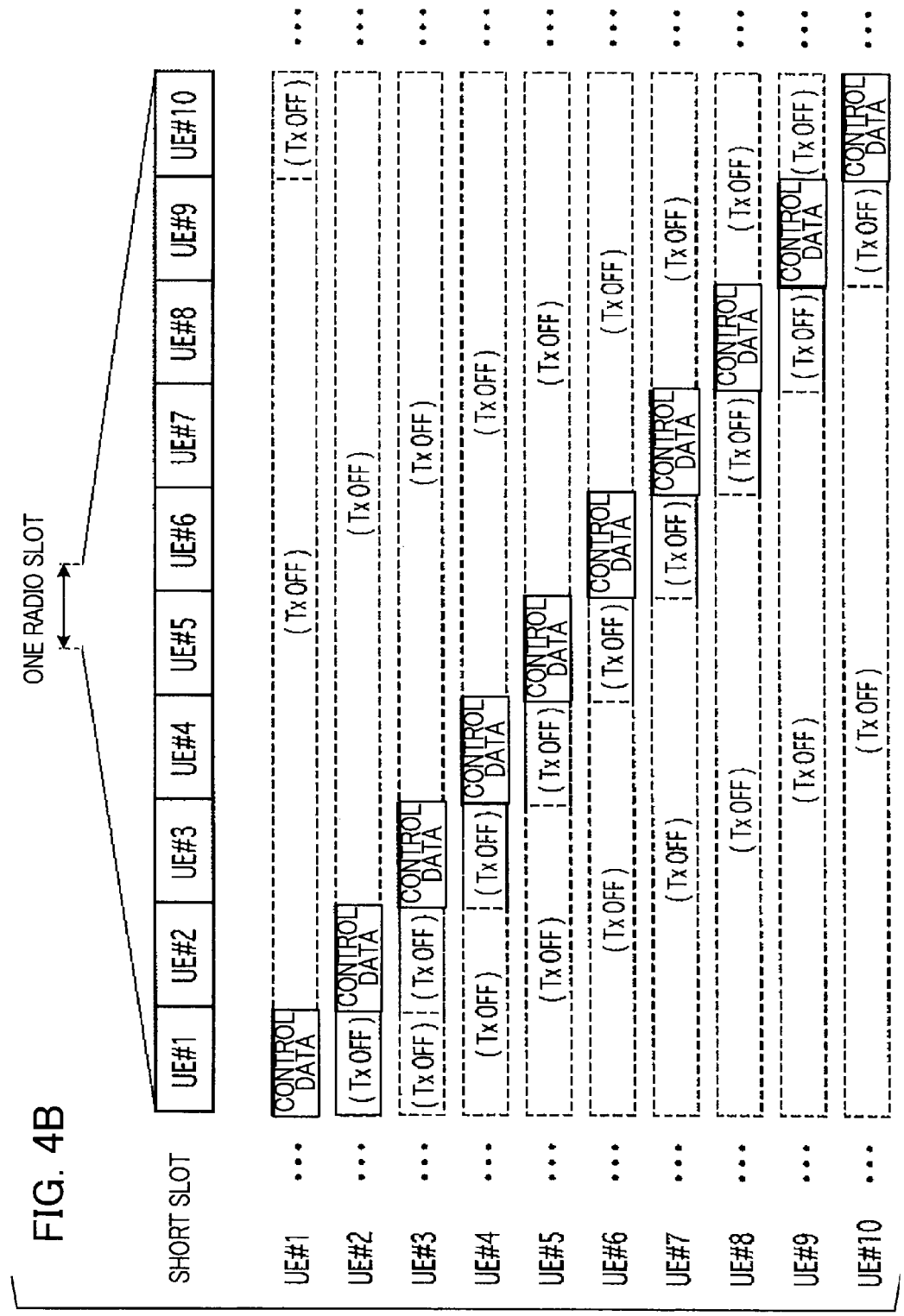

| SHORT SLOT | USAGE STATUS |
|---|---|
| #1 | OCCUPIED |
| #2 | OCCUPIED |
| #3 | OCCUPIED |
| #4 | OCCUPIED |
| #5 | UNOCCUPIED |
| #6 | OCCUPIED |
| #7 | UNOCCUPIED |
| #8 | OCCUPIED |
| #9 | UNOCCUPIED |
| #10 | UNOCCUPIED |

FIG. 7

| SHORT SLOT | CANDIDATE RADIO TRANSMISSION TIMING (CHIPS) |
|---|---|
| #1 | $256 \times 10 \times \alpha + 256 \times 9$ |
| #2 | $256 \times 10 \times \alpha$ |
| #3 | $256 \times 10 \times \alpha + 256 \times 1$ |
| #4 | $256 \times 10 \times \alpha + 256 \times 2$ |
| #5 | $256 \times 10 \times \alpha + 256 \times 3$ |
| #6 | $256 \times 10 \times \alpha + 256 \times 4$ |
| #7 | $256 \times 10 \times \alpha + 256 \times 5$ |
| #8 | $256 \times 10 \times \alpha + 256 \times 6$ |
| #9 | $256 \times 10 \times \alpha + 256 \times 7$ |
| #10 | $256 \times 10 \times \alpha + 256 \times 8$ |

RADIO CONTROL APPARATUS AND RADIO TRANSMISSION TIMING DETERMINATION METHOD

TECHNICAL FIELD

The present invention relates to radio control apparatuses and radio transmission timing determination methods, and more particularly, to a radio control apparatus and a radio transmission timing determination method for use in a multiple access scheme, which allows a plurality of users to perform communication simultaneously by sharing a single radio transmission path.

BACKGROUND ART

Known multiple access schemes, which allow a plurality of users to perform communication simultaneously by sharing a single radio transmission path, include code division multiple access (CDMA), time division multiple access (TDMA), and frequency division multiple access (FDMA). An example of the TDMA technology is disclosed in patent document 1. Wideband CDMA (W-CDMA) is one known multiple access scheme for third-generation mobile phones.

In CDMA communication systems in which a plurality of channels share the same frequency band, such as the W-CDMA cellular system, individual channels used in the cell formed by a radio base station apparatus are identified by channelization codes, which are code sequences with good code-to-code identification characteristics, that is, with good orthogonality.

Although the channelization codes have good identification characteristics, the number of the codes is limited. To increase the radio communication rate, the length of the code sequence should be shortened. A shortened channelization code sequence, however, means that the code space reserved for each single code would be significantly wasted. Accordingly, the number of channelization codes to be actually used has been a subject to be reduced.

To solve the problem, the Third Generation Partnership Project (3GPP) added a fractional dedicated physical channel (F-DPCH) to the W-CDMA cellular system (non-patent document 1). In F-DPCH, each single radio slot is time-divided into ten short slots. Each single short slot is assigned to one of multiple users assigned a single channelization code, so that up to ten users can share the single code. Unlike the conventional systems, F-DPCH prevents one code from being occupied by a single user. Consequently, the channelization codes can be used efficiently.

Patent document 1: Japanese Unexamined Patent Application Publication No. 2-260929
Non-patent document 1: "3GPP TS 25.211 V 6.9.0", [online] November 2007, $3^{rd}$ Generation Partnership Project, [retrieved on Jan. 23, 2008].

DISCLOSURE OF INVENTION

Problems to be Solved by the Invention

If F-DPCH described above is used, a radio control apparatus may use a fixed rule for determining radio transmission timings for short slots that are allocated to the users without overlapping. However, if the radio transmission timings are determined by a fixed rule, there is a very strong possibility that the radio transmission timing of a radio frame used by a radio base station apparatus for communication with each user in its cell will overlap with the radio transmission timing of a radio frame used by another radio base station apparatus for communication with each user in its cell. In that case, a momentary increase in the amount of radio interference would occur and cause a loss in radio quality.

The present invention is provided to solve the problems described above. An object of the invention is to provide a radio control apparatus and a radio transmission timing determination method that can improve radio quality by allocating different short slots to a plurality of radio mobile stations that use the same channelization code and by distributing the radio transmission timings of radio frames for a plurality of users.

Means for Solving the Problems

According to one aspect of the present invention, a radio control apparatus is used in a CDMA communication system where each radio slot has a plurality of short slots and allows a plurality of radio mobile stations connected to a radio base station apparatus and using a single channelization code to share the same radio slot by allocating different short slots to the plurality of radio mobile stations for communication with the radio base station apparatus. The radio control apparatus includes short slot storage means for storing a usage status of a short slot allocated to a radio link between a first radio mobile station and the radio base station apparatus; short slot selection means for selecting an unoccupied short slot for a radio link between a second radio mobile station and the radio base station apparatus, in accordance with the usage status stored in the short slot storage means; and transmission timing determination means for randomly determining the radio transmission timing of a radio frame used for communication between the second radio mobile station and the radio base station apparatus, in accordance with the short slot selected by the short slot selection means, such that the timing does not overlap with the radio transmission timing of a radio frame used for communication between the first radio mobile station and the radio base station apparatus.

In this structure, the short slot selection means allocates a short slot to a radio link between the second radio mobile station and the radio base station apparatus, and the short slot differs from the short slot used by the first radio mobile station which has already been connected to the radio base station apparatus. Then, the transmission timing determination means randomly determines the radio transmission timing of a radio frame for the radio link between the second radio mobile station and the radio base station apparatus such that the radio transmission timing does not overlap with the radio transmission timing of a radio frame for the radio link between the first radio mobile station and the radio base station apparatus, on the basis of the short slot selected by the short slot selection means for the second radio mobile station. By randomly determining the radio transmission timing of a radio frame for a new radio link in a single cell, the radio transmission timings of radio frames for a plurality of users can be distributed in the cell. This reduces the possibility of overlapping of the radio transmission timing of a radio frame used by a radio link between the radio base station apparatus and a radio mobile station in the cell with the radio transmission timing of a radio frame used by a radio link between another radio base station apparatus and a radio mobile station in the other cell, and the risk of radio interference is reduced. Both of the utilization efficiency of the channelization code and radio quality can be improved, as described above.

It is preferable that the transmission timing determination means determine the radio transmission timing of the radio frame such that control data to be exchanged between the second radio mobile station and the radio base station apparatus is sent via the short slot selected for the radio link between the second radio mobile station and the radio base station apparatus.

In other words, it is preferable that the transmission timing determination means determine the radio transmission timing of the radio frame such that control data communication can be transmitted on the radio link between the second radio mobile station and the radio base station apparatus via the short slot allocated by the short slot selection means. By determining different radio transmission timings of radio frames for different radio links, control data is consequently transmitted in different short slots depending on the radio links.

It is preferable that the radio control apparatus further include radio transmission timing storage means for storing, for each short slot, a formula for determining a candidate radio transmission timing of a radio frame and that the transmission timing determination means obtain from the radio transmission timing storage means a formula corresponding to the short slot selected for the radio link between the second radio mobile station and the radio base station apparatus by the short slot selection means and randomly determine the radio transmission timing of the radio frame used for communication between the second radio mobile station and the radio base station apparatus by using the obtained formula. Use of the formula corresponding to the short slot selected for the new radio link simplifies the processing for randomly determining the radio transmission timing of the radio frame.

It is preferable that the formula include a variable and that the transmission timing determination means determine the radio transmission timing of the radio frame used for communication between the second radio mobile station and the radio base station apparatus by randomly selecting one candidate value of the variable. Selecting the value of the variable randomly simplifies the processing for randomly determining the radio transmission timing of the radio frame.

According to another aspect of the present invention, a radio transmission timing determination method is used in a CDMA communication system where each radio slot has a plurality of short slots and allows a plurality of radio mobile stations connected to a radio base station apparatus and using a single channelization code to share the same radio slot by allocating different short slots to the plurality of radio mobile stations for communication with the radio base station apparatus. The radio transmission timing determination method includes an occupied short slot reference step of referencing the short slot occupied by a first radio mobile station which has already been connected to the radio base station apparatus; a short slot selection step of selecting an unoccupied short slot out of all short slots in a radio frame for a radio link between a second radio mobile station and the radio base station apparatus, in accordance with the result of reference in the occupied short slot reference step; and a timing determination step of randomly determining the radio transmission timing of a radio frame used for communication between the second radio mobile station and the radio base station apparatus, in accordance with the selected short slot, such that the timing does not overlap with the radio transmission timing of a radio frame used for communication between the first radio mobile station and the radio base station apparatus.

For the same reason as that described above in relation to the radio control apparatus according to the present invention, a radio transmission timing determination method according to the present invention reduces the possibility of overlapping of the radio transmission timing of a radio frame used by a radio link between the radio base station apparatus and a radio mobile station in the cell with the radio transmission timing of a radio frame used by a radio link between another radio base station apparatus and a radio mobile station in the cell and reduces the risk of radio interference. Accordingly, both the utilization efficiency of the channelization code and radio quality can be improved.

BRIEF DESCRIPTION OF THE DRAWINGS

FIG. 4A is a view showing an example of the allocation of radio transmission timings of radio frames to radio mobile stations in the embodiment of the present invention.

FIG. 4B is a view illustrating an example of the allocation of short slots to the radio mobile stations in the embodiment of the present invention.

FIG. 7 is a view showing a table stored in a slot-timing association storage unit in the embodiment of the present invention.

BEST MODE FOR CARRYING OUT THE INVENTION

One of best modes of the present invention will be described with reference to the drawings.

Figure 1A:
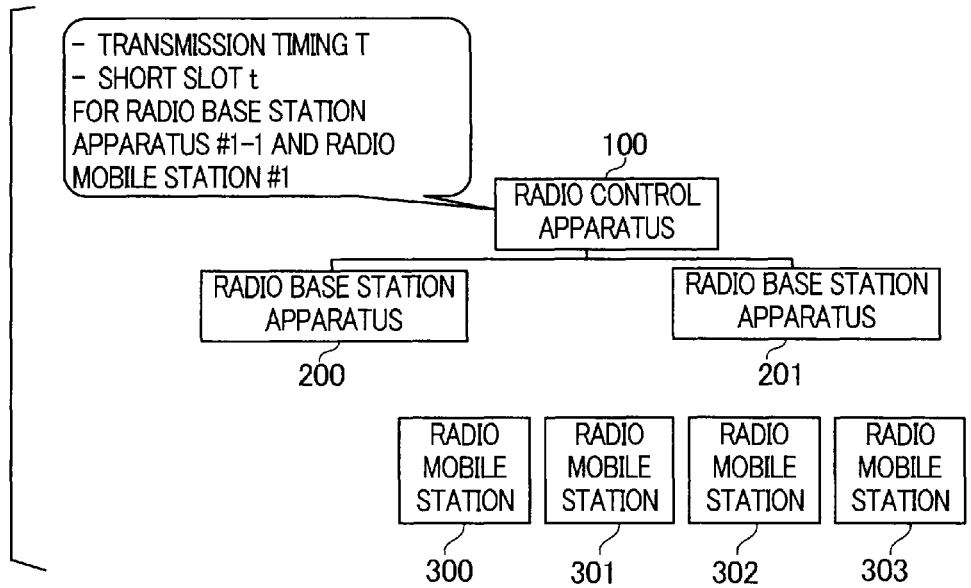
FIG. 1A is a block diagram showing an example of the structure of a radio access network to which the present invention is applied.

FIG. 1A shows an example of the structure of a representative radio access network to which the present invention is applied.

Radio base station apparatuses 200 and 201 are connected to a radio control apparatus 100. The radio control apparatus 100 determines, notifies, and manages, for the radio base station apparatuses 200 and 201, short slots and the radio transmission timings allocated to a plurality of radio mobile stations 300 to 304 that perform radio communication with the radio base station apparatuses 200 and 201. For the sake of simplicity, the figure shows just two radio base station apparatuses 200 and 201 and four radio mobile stations 300 to 304. Actually, the radio access network has a greater number of radio base station apparatuses and a greater number of radio mobile stations. This embodiment uses W-CDMA, especially a technology for allowing a plurality of radio mobile stations using the same channelization code in the same cell to share each radio slot, more specifically, a technology using F-DPCH.

In the example shown in FIG. 1A, suppose that the radio base station apparatus 200 connected to the radio control apparatus 100 is assigned a number #1-1 and the radio mobile station 300 is assigned a number #1. The radio control apparatus 100 gives the radio base station apparatus #1-1 and the radio base station apparatus #1 an instruction to perform communication at a transmission timing T via a short slot t. The instruction from the radio control apparatus 100 is sent to the radio base station apparatus 200, and is then sent from the radio base station apparatus 200 to the radio mobile station 300.

Figure 1B:
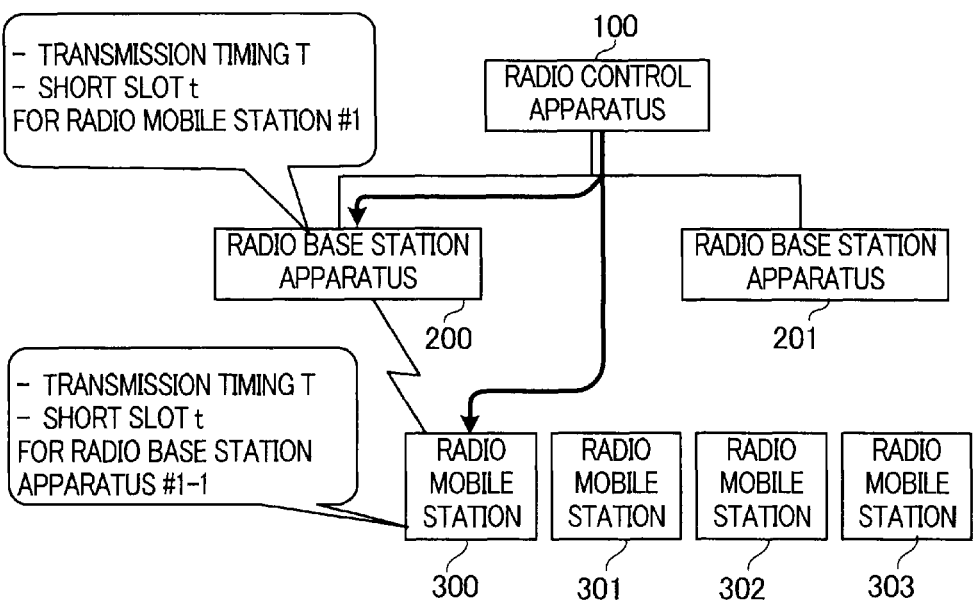
FIG. 1B is a view showing an example in which a radio control apparatus of the radio access network to which the present invention is applied gives an instruction to a radio base station apparatus and a radio mobile station.

As shown in FIG. 1B, the radio base station apparatus 200 (#1-1) and the radio mobile station 300 (#1) perform communication at the transmission timing and via the short slot specified in the instruction. This embodiment relates to W-CDMA downlink communication using F-DPCH. The radio base station apparatus 200 (#1-1) sends control data (such as a transmission power control command) to the radio mobile station 300 (#1) in accordance with the radio frame transmission timing T via the short slot t. The radio mobile station 300 (#1) receives the control data in accordance with a radio frame reception timing T by using the short slot t.

Figure 2:
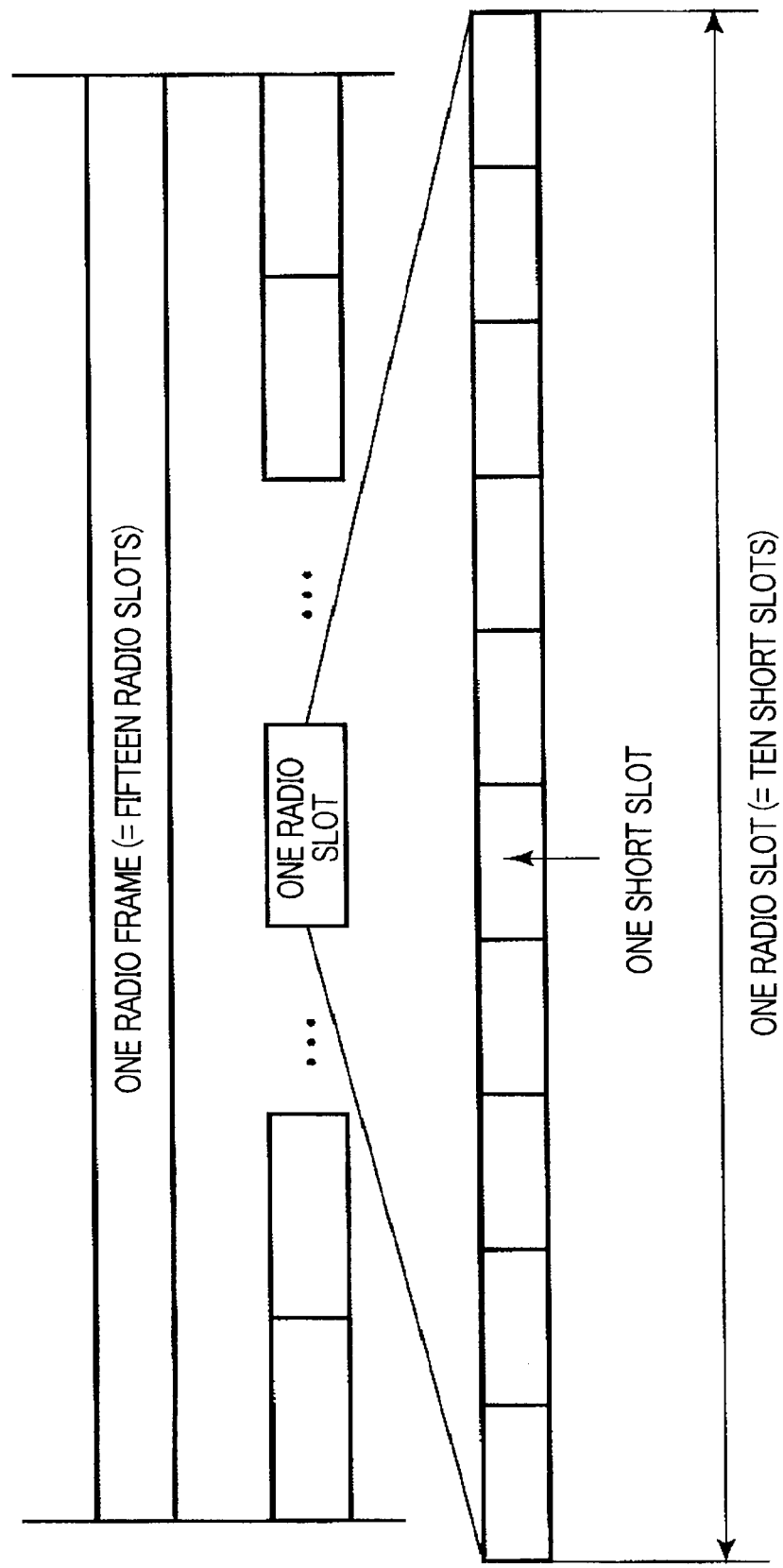
FIG. 2 is a view showing the relationship among short slots, radio slots, and a radio frame, in one embodiment of the present invention.

FIG. 2 shows the relationship among short slots, radio slots, and a radio frame. The short slot is a time slot obtained by dividing a single radio slot having a length of 2,560 chips by a given number. In F-DPCH defined in W-CDMA, a single radio slot has ten short slots, so that the length of a single short slot is 256 chips. A plurality of radio slots constitute a single radio frame. In W-CDMA, the single radio frame has fifteen radio slots (#1 to #15), so that the length of the single radio frame is 38,400 chips.

Figure 3:
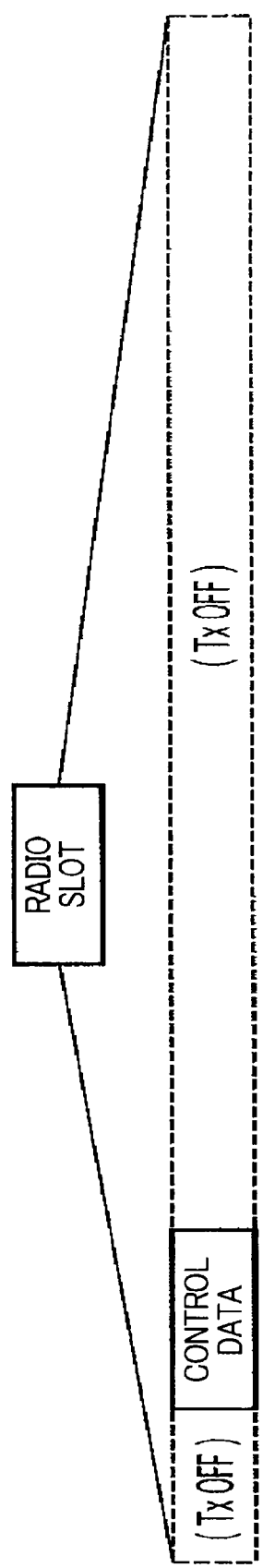
FIG. 3 is a view showing the contents of short slots in a single radio slot in the embodiment of the present invention.

FIG. 3 shows an example of data in a short slot, sent in the radio slot. In the single radio slot, control data (such as a transmission power control command) is sent from the radio base station apparatus to a single radio mobile station in a given short slot. In the period of the radio slot other than the short slot, the radio base station apparatus does not send control data to the radio mobile station ("Tx OFF" in FIG. 3 means that nothing is sent), and the radio base station apparatus sends control data to the other (up to nine) radio mobile stations using the same channelization code as that the radio mobile station uses. In that way, a plurality of (up to 10) radio mobile stations using the same channelization code shares the radio slot in a single cell.

FIG. 4A shows an example of the allocation of radio transmission timings of radio frames to the radio mobile stations. As shown in the figure, different radio transmission timings of radio frames are allocated to individual users (radio mobile stations) using the same downlink channelization code. FIG. 4B is a view illustrating an example of the allocation of short slots to the radio mobile stations. As shown in the figure, short slots are allocated to individual users (radio mobile stations) using the same downlink channelization code. In this specification, the radio transmission timing means a time lag between the reference timing of the cell formed by a radio base station apparatus (such as the radio base station apparatus 200) and the start timing of a radio frame (and thus, the start timing of a series of radio frames.

As shown in FIG. 4A, the single radio frame has radio slots #1 to #15. A radio mobile station (UE) #1 receives a radio frame in accordance with a radio transmission timing #1. A radio mobile station (UE) #2 receives a radio frame in accordance with a radio transmission timing #2. Subsequent radio mobile stations receive radio transmission frames in accordance with timings corresponding to the radio mobile station numbers, and a radio mobile station (UE) #10 receives a radio frame in accordance with a radio transmission timing #10.

As shown in FIG. 4B, each single radio slot includes short slots UE#1 to UE#10. The radio mobile station (UE) #1 receives control data in the first short slot and does not receive control data in the remaining short slots. The radio mobile station (UE) #2 receives control data in the second short slot and does not receive control data in the remaining short slots. The subsequent radio mobile stations receive control data in the corresponding subsequent short slots, as shown in FIG. 4B. Each radio mobile station receives control data at the same ordered short slot in the next and subsequent radio slots as that used in the current radio slot, although not shown in the figure. For example, the radio mobile station (UE) #1 receives control data in the first short slot in the next radio slot. This means that the single radio mobile station receives control data at intervals of 2,560 chips (the length of the radio slot).

Figures 5, 6:
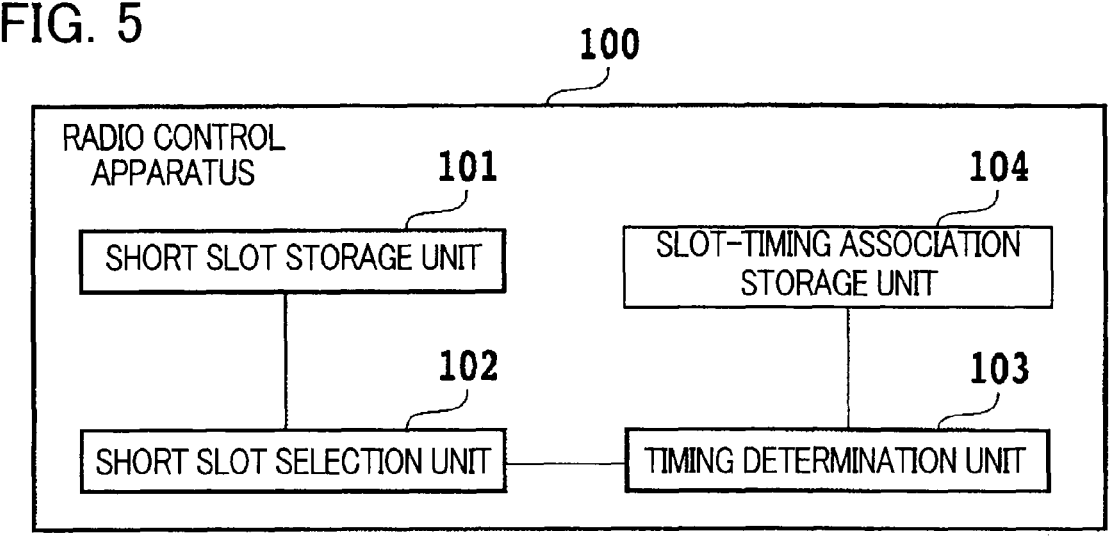
FIG. 5 is a block diagram showing the structure of the radio control apparatus in the embodiment of the present invention.
FIG. 6 is a view showing a table stored in a short slot storage unit in the embodiment of the present invention.

FIG. 5 shows an example of the structure of the radio control apparatus 100. The radio control apparatus 100 includes a short slot storage unit 101 (short slot storage means), a short slot selection unit 102 (short slot selection means), a timing determination unit 103 (transmission timing determination means), and a slot-timing association storage unit 104 (radio transmission timing storage means).

The short slot storage unit 101 stores a usage status table which shows how the short slots has been used by the radio mobile stations using the same downlink channelization code in the same cell. The short slot selection unit 102 selects a short slot on the basis of the usage statuses of the short slots stored in the short slot storage unit 101. The timing determination unit 103 determines the transmission timing of radio frames, depending on the short slot selected by the short slot selection unit 102. The slot-timing association storage unit 104 stores the association between the short slots and candidate transmission timings of radio frames.

FIG. 6 shows an example of the usage status table of the short slots, managed by the short slot storage unit 101. The short slot storage unit 101 stores a plurality of usage status tables corresponding to a plurality of channelization codes in a plurality of cells.

Suppose that the radio control apparatus 100 allocates a short slot (e.g., short slot #5) to a radio link between a radio base station apparatus (such as the radio base station apparatus 200) and a radio mobile station connected by radio to the radio base station. Then, in the short slot storage unit 101, the usage status of the short slot #5 is updated from "unoccupied" to "occupied." The usage status table thus stores information indicating whether each short slot is used by any radio link for a set of a radio base station apparatus and a radio mobile station with which the radio base station apparatus communicates. In other words, the usage status table stores information indicating the short slot used by a radio mobile station that has been already connected to a radio base station apparatus.

When a short slot is newly allocated to a new radio link between the radio base station apparatus (such as the radio base station apparatus 200) and another (new) radio mobile station connected by radio to the radio base station, the short slot selection unit 102 references the short slot storage unit 101 and selects one of the short slots for which usage statuses are indicated as "unoccupied." This selection may be made in a given sequence or at random.

The timing determination unit 103 then determines the radio transmission timing of radio frames to be used for communication in the new radio link between the radio base station apparatus (such as the radio base station apparatus 200) and the other (new) radio mobile station, in accordance with the selected unoccupied short slot, such that this radio transmission timing does not overlap with the radio transmission timings of the radio frames used for communication in existing radio links between the radio base station apparatus (such as the radio base station apparatus 200) and radio mobile stations that have been already connected to the apparatus.

The timing determination unit 103 determines the radio transmission timing of the radio frames randomly for communication between the other (new) radio mobile station for which the short slot has been selected and the radio base station apparatus (such as the radio base station apparatus 200), such that the amount of interference caused in the communication between another radio mobile station and another radio base station apparatus (such as the radio base station apparatus 201) is reduced. The radio transmission timing of the radio frames may be determined randomly as described below.

In a first step, the timing determination unit 103 references the association between short slots and candidate radio transmission timings stored in a candidate radio transmission timing management table stored in the slot-timing association storage unit 104. FIG. 7 shows the candidate radio transmission timing management table managed by the slot-timing association storage unit 104.

The short slot numbers (#1 to #10) listed in FIGS. 6 and 7, which are the short slot numbers that can be selected by the short slot selection unit 102, are based on the above-mentioned reference timing of the cell and are not based on the start time point of the radio frames.

The timing determination unit 103 references the candidate radio transmission timing management table and selects, from among the table, one of candidate radio transmission timings of the radio frames that corresponds to the short slot selected as described above. In the example shown in the figure, each candidate radio transmission timing is indicated by the number of chips expressed by a numerical formula that includes a variable a (integer).

The timing determination unit 103 then determines the radio transmission timing of the radio frames by randomly selecting (determining) the value of the variable a included in the corresponding candidate radio transmission timing from among possible candidates (described later). The process of randomly determining the radio transmission timing of the radio frame is simplified by using the formula corresponding to the short slot selected for the new radio link and by randomly selecting the value of the variable a in the first term of the formula.

In this embodiment, the candidate radio transmission timings in the candidate radio transmission timing management table in FIG. 7 are specified by taking into consideration the time lag range (0 to 38,399 chips) between the reference timing of the cell and the start timing of the radio frames in W-CDMA. For F-DPCH, there are fifteen candidate radio transmission timings in total (the candidate values of the variable a are integers 0 to 14). If $\alpha=15$, all the candidate radio transmission timings in FIG. 7 exceed 38,399. If $\alpha=14$, all the candidate radio transmission timings in FIG. 7 fall below 38,399.

In the formula shown in FIG. 7, "256×10" in the first term expresses the length of each radio slot, and "256" in the second term expresses the length of each short slot. The second terms of the formulae listed in FIG. 7 are "256×0", "256×1", "256×2", . . . , and "256×9". If the radio transmission timing of the radio frames is determined as described above, the radio transmission timing of the radio frames allocated to the new radio link starts from a time point away from the reference timing of the cell by the product of 256 and an integer. Therefore, if the timing determination unit 103 determines the variable a in the formula corresponding to the short slot selected (allocated) by the short slot selection unit 102, thereby determining the radio transmission timing of the radio frames, the short slot allocated by the short slot selection unit 102 becomes effective (control data communication is implemented in the new radio link between the radio base station apparatus and the new radio mobile station, by using the short slot allocated by the short slot selection unit 102). In other words, the timing determination unit 103 determines the radio transmission timing of the radio frames such that control data to be exchanged between the new radio mobile station and the radio base station apparatus is sent via the short slot selected for the new radio link between the new radio mobile station and the radio base station apparatus. Different radio transmission timings of radio frames are determined for different radio links, and consequently, control data is sent in different short slots depending on the radio links. The radio control apparatus 100 executes the operation described above for each channelization code of each cell. In that way, a plurality of radio mobile stations can share the radio slot.

As will be understood from the above description, the short slot selection unit 102 allocates to the radio link between the new radio mobile station and the radio base station apparatus, a short slot differing from the short slots used by the radio mobile stations that have already been connected to the radio base station apparatus. Then, the timing determination unit 103 randomly determines the radio transmission timing of the radio frames for the radio link between the new radio mobile station and the radio base station apparatus in accordance with the short slot selected by the short slot selection unit 102 for the new radio mobile station, such that the radio transmission timing does not overlap with the radio transmission timings of radio frames for any existing radio link between the radio base station apparatus and any of other radio mobile stations that has already been connected to the radio base station apparatus. By randomly determining the radio transmission timings of radio frames for a new radio link in a single cell, as described above, the radio transmission timings of radio frames for a plurality of users can be distributed in the cell. This reduces the possibility of overlapping of the radio transmission timing of the radio frame used by the radio link between the radio base station apparatus (such as the radio base station apparatus 200) and a radio mobile station in the cell (the cell of the radio base station apparatus 200) with the radio transmission timings of radio frames used by other radio links between any of other radio base station apparatuses (such as the radio base station apparatus 201) and a radio mobile station in the cell (such as the cell of the radio base station apparatus 201), and the risk of radio interference is reduced. Accordingly, both the utilization efficiency of the channelization code and the radio quality can be improved.

Besides the embodiment described above, a number of modifications are possible. Modifications based on the technological idea described in the claims fall within the scope of the present invention.

For example, the embodiment described above relates to a technology for using F-DPCH in W-CDMA downlink communication, but the present invention is not limited to this embodiment. This invention can be applied to another technology for allowing a plurality of radio mobile stations using the same channelization code in a single cell to share the same radio slot. The present invention can also be applied to uplink communication as well. If the present invention is applied to uplink communication, the possibility of overlapping of the radio transmission timing of radio frames used by an uplink between a radio base station apparatus (such as the radio base station apparatus 200) and a radio mobile station in the cell (the cell of the radio base station apparatus 200) with the radio transmission timing of radio frames used by other uplinks between any of other radio base station apparatuses (such as the radio base station apparatus 201) and a radio mobile station in the cell (such as the cell of the radio base station apparatus 201) is reduced, and the risk of radio interference is reduced.

The invention claimed is:

1. A radio control apparatus used in a CDMA communication system where each radio slot has a plurality of short slots and allowing a plurality of radio mobile stations connected to a radio base station apparatus and using a single channelization code to share the same radio slot by allocating different short slots to the plurality of radio mobile stations for communication with the radio base station apparatus, the radio control apparatus comprising:

short slot storage means for storing a usage status of a short slot allocated to a radio link between a first radio mobile station and the radio base station apparatus;

short slot selection means for selecting an unoccupied short slot for a radio link between a second radio mobile station and the radio base station apparatus, in accordance with the usage status stored in the short slot storage means;

transmission timing determination means for randomly determining the radio transmission timing of radio frames used for communication between the second radio mobile station and the radio base station apparatus, in accordance with the short slot selected by the short slot selection means, such that the timing is not the same as the radio transmission timing of radio frames used for communication between the first radio mobile station and the radio base station apparatus, wherein the radio transmission timing is a time lag between the reference timing of the cell formed by the radio base station apparatus and the start timing of a series of radio frames destined for a radio mobile station, and each of the plurality of short slots being associated with a different radio transmission timing; and radio transmission timing storage means for storing, for respective short slots, different formulae for determining candidate radio transmission timings of radio frames;

wherein the transmission timing determination means obtains from the radio transmission timing storage means a formula corresponding to the short slot selected for the radio link between the second radio mobile station and the radio base station apparatus by the short slot selection means and randomly determines the radio transmission timing of the radio frames used for communication between the second radio mobile station and the radio base station apparatus by using the obtained formula.

2. A radio control apparatus according to claim 1, wherein the transmission timing determination means determines the radio transmission timing of the radio frames such that control data to be exchanged between the second radio mobile station and the radio base station apparatus is sent via the short slot selected for the radio link between the second radio mobile station and the radio base station apparatus.

3. A radio control apparatus according to claim 1, wherein each of the different formulae stored in the radio transmission timing storage means includes a variable, and the transmission timing determination means determines the radio transmission timing of the radio frames used for communication between the second radio mobile station and the radio base station apparatus by randomly selecting one candidate value of the variable, after obtaining from the radio transmission timing storage means the formula corresponding to the short slot selected by the short slot selection means.

4. A radio transmission timing determination method used in a CDMA communication system where each radio slot has a plurality of short slots and allowing a plurality of radio mobile stations connected to a radio base station apparatus and using a single channelization code to share the same radio slot by allocating different short slots to the plurality of radio mobile stations for communication with the radio base station apparatus, the radio transmission timing determination method comprising:

an occupied short slot reference step of referencing the short slot occupied by a first radio mobile station which has already been connected to the radio base station apparatus;

a short slot selection step of selecting an unoccupied short slot out of all short slots in a radio slot for a radio link between a second radio mobile station and the radio base station apparatus, in accordance with the result of reference in the occupied short slot reference step; and a timing determination step of randomly determining the radio transmission timing of radio frames used for communication between the second radio mobile station and the radio base station apparatus, in accordance with the selected short slot, such that the timing is not the same as the radio transmission timing of a radio frame used for communication between the first radio mobile station and the radio base station apparatus, wherein the radio transmission timing is a time lag between the reference timing of the cell formed by the radio base station apparatus and the start timing of a series of radio frames destined for a radio mobile station, and each of the plurality of short slots being associated with a different radio transmission timing, wherein the timing determination step comprises obtaining a formula corresponding to the short slot selected at the short slot selection step from a radio transmission timing storage means that stores different formulae for determining candidate radio transmission timings for respective short slots, and using the obtained formula for randomly determining the radio transmission timing of the radio frames used for communication between the second radio mobile station and the radio base station apparatus.

5. A radio transmission timing determination method according to claim 4, wherein in the timing determination step, the radio transmission timing of the radio frames is determined such that control data to be exchanged between the second radio mobile station and the radio base station apparatus is sent via the short slot selected for the radio link between the second radio mobile station and the radio base station apparatus.

6. A radio transmission timing determination method according to claim 4, wherein each of the different formulae stored in the radio transmission timing storage means includes a variable, and wherein the transmission timing determination step comprises randomly selecting one candidate value of the variable for determining the radio transmission timing of the radio frames used for communication between the second radio mobile station and the radio base station apparatus, after obtaining from the radio transmission timing storage means the formula corresponding to the short slot selected at the short slot selection step.

7. A radio transmission timing determination method according to claim 5, wherein the timing determination step comprises obtaining a formula from a radio transmission timing storage means that stores formulae for determining candidate radio transmission timings for respective short slots, and using the obtained formula corresponding to the short slot selected for the radio link between the second radio mobile station and the radio base station apparatus at the short slot selection step for randomly determining the radio transmission timing of the radio frames used for communication between the second radio mobile station and the radio base station apparatus.

8. A radio transmission timing determination method according to claim 7, wherein the formula includes a variable, and wherein the transmission timing determination step comprises randomly selecting one candidate value of the variable for determining the radio transmission timing of the radio frames used for communication between the second radio mobile station and the radio base station apparatus.

* * * * *